W. ATWOOD.
Washing-Machine.
No. 166,579.  Patented Aug. 10, 1875.
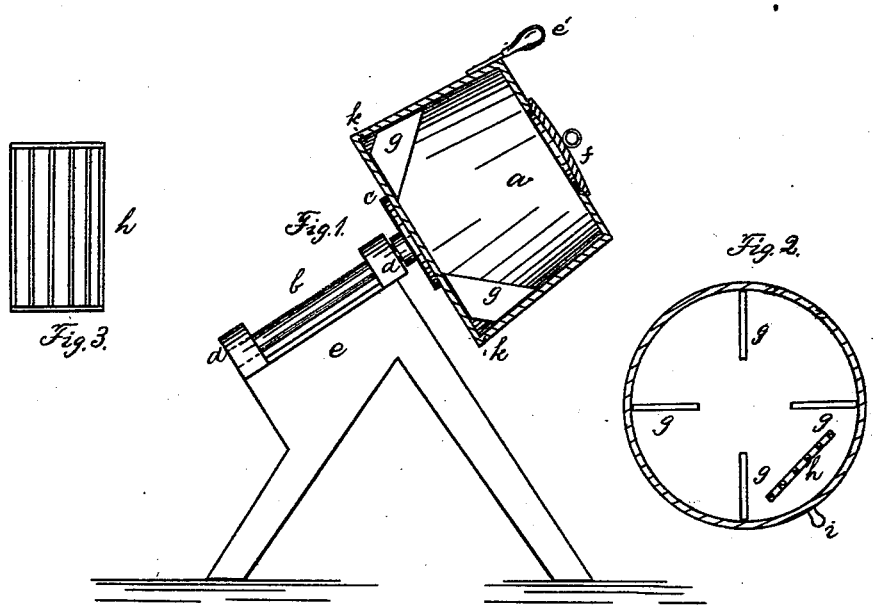
Witnesses:—
Frank H. Jordan
Charles E. Clifford
Inventor:
William Atwood
per Wm. Henry Clifford
atty.

UNITED STATES PATENT OFFICE.

WILLIAM ATWOOD, OF CAPE ELIZABETH, MAINE.

IMPROVEMENT IN WASHING-MACHINES.

Specification forming part of Letters Patent No. 166,579, dated August 10, 1875; application filed May 26, 1875.

*To all whom it may concern:*

Be it known that I, WILLIAM ATWOOD, of Cape Elizabeth, in the county of Cumberland and State of Maine, have invented certain new and useful Improvements in Rotary Wash-Tubs; and I do hereby declare that the following is a full, clear, and exact description thereof, which will enable others skilled in the art to which it pertains to make and use the same, reference being had to the accompanying drawings, and to the letters of reference marked thereon, which form a part of this specification.

Figure 1 is a vertical longitudinal section of shaft, bearings, frame, and tub. Fig. 2 is a section at right angles to the axis, and through the tub, showing the position of the wings for producing agitation. Fig. 3 is a grating to be used for draining clothes in washing.

Same letters show like parts.

The object of my invention is the production of a rotary wash-tub; and consists of a rotary chamber revolving about an inclined axis, the same having wings.

In the accompanying drawings, $a$ is a revolving receptacle to contain the materials to operated upon. $b$ shows the inclined shaft, connected to the receptacle by the flange $c$. $d\ d$ show the bearings for the shaft supported by the frame $e$. $g$ shows wings, stopping a little short of the corners of the vessel, as shown at $k$, Fig. 1. This is to facilitate the drawing off of liquid which may remain behind the wings. $h$, Fig. 2, shows a grate, and Fig. 3 a plan of the same. This grate is placed over the discharge-plug $i$. Any filter or strainer may be substituted for it; or it may be used with any filtering material. The strainer is put in place when the plug is on the upper side of the vessel, and is held in place until the vessel is revolved so as to bring the grate under the contents, and the plug in the right position for drawing off the contents. $e'$ shows a crank for turning the vessel. $f$ shows a cover to the vessel.

The operation is as follows: The clothes, with hot water, soap, &c., are placed in the vessel, which being rotated produces the following operations: Each wing $g$, as it comes down upon the top of the clothes, forces them under water, and under such of the clothes as may be in the center of the tub; then along the bottom and up on the other side, until they fall off into the center. If there is too much in the vessel to allow of the chance to fall the whole mass is turned over and over with a combined motion, which is made up of a horizontal and perpendicular revolution. This is produced by the inclined axis. When the washing is completed the grate is put in place, when the plug is on the top of the vessel. The vessel is then turned half around. The water is then drawn off by the removal of the plug. The same operation is repeated with the rinse-water. Bluing may be introduced into the rinse-water, and, by a few revolutions, diffused through the clothes.

The advantage of my invention results from the revolution of the vessel about the inclined axis.

Any convenient form to suit the work to be done may be given to the vessel or receptacle.

It is evident that the above-described bearings for the shaft are not essential to my invention, but that such bearings may be used and so placed as will be most convenient, the inclination of the axis being maintained. Such draw-off apertures may be made as the nature of the substance operated on requires, and these may be placed according to convenience.

What I claim as my invention, and desire to secure by Letters Patent, is—

The vessel $a$, constructed to rotate upon the inclined axis $b$, having the wings $g$, grating $h$, and discharge-plug $i$, as shown and described.

In testimony that I claim the foregoing as my own I affix my signature in presence of two witnesses.

WM. ATWOOD.

Witnesses:
WM. HENRY CLIFFORD,
FRANK H. JORDAN.